(12) United States Patent
Anreddy et al.

(10) Patent No.: US 8,306,473 B2
(45) Date of Patent: Nov. 6, 2012

(54) METHODS AND APPARATUS FOR USING MULTIPLE ANTENNAS HAVING DIFFERENT POLARIZATION

(75) Inventors: Vikram Reddy Anreddy, Somerset, NJ (US); Xinzhou Wu, Monmouth Junction, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 876 days.

(21) Appl. No.: 12/032,454

(22) Filed: Feb. 15, 2008

(65) Prior Publication Data

US 2009/0207093 A1    Aug. 20, 2009

(51) Int. Cl.
*H04B 1/00* (2006.01)
*H04B 7/00* (2006.01)
*H04M 1/00* (2006.01)

(52) U.S. Cl. ......... 455/39; 455/63.4; 455/69; 455/562.1

(58) Field of Classification Search .................. 455/101, 455/132, 272–277.2, 562.1, 575.7, 39, 63.4, 455/69
See application file for complete search history.

(56) References Cited

U.S. PATENT DOCUMENTS

| | | | |
|---|---|---|---|
| 6,411,824 B1 * | 6/2002 | Eidson ........................... | 455/561 |
| 6,801,790 B2 * | 10/2004 | Rudrapatna ................. | 455/562.1 |
| 6,870,515 B2 * | 3/2005 | Kitchener et al. ........... | 343/853 |
| 7,062,245 B2 * | 6/2006 | Miyano et al. .............. | 455/277.1 |
| 7,099,265 B2 * | 8/2006 | Kuwabara et al. ........... | 370/203 |
| 7,310,379 B2 * | 12/2007 | Sibecas et al. ................ | 375/267 |
| 7,596,354 B2 * | 9/2009 | Schiff ........................... | 455/63.4 |
| 7,643,853 B2 * | 1/2010 | Knudsen et al. ........... | 455/562.1 |
| 2003/0008614 A1 * | 1/2003 | Hanson et al. ................ | 455/12.1 |
| 2004/0095278 A1 * | 5/2004 | Kanemoto et al. ..... | 343/700 MS |
| 2004/0203538 A1 * | 10/2004 | Leppanen et al. ............ | 455/101 |
| 2005/0003763 A1 * | 1/2005 | Lastinger et al. ............ | 455/63.1 |
| 2006/0105730 A1 * | 5/2006 | Modonesi et al. ............ | 455/273 |
| 2007/0008943 A1 * | 1/2007 | Grant et al. .................... | 370/342 |
| 2007/0047678 A1 * | 3/2007 | Sibecas et al. ................ | 375/343 |
| 2007/0099578 A1 * | 5/2007 | Adeney et al. .................. | 455/69 |
| 2008/0102760 A1 * | 5/2008 | McConnell et al. ............ | 455/73 |
| 2009/0209212 A1 * | 8/2009 | Cetiner et al. ............... | 455/90.2 |

(Continued)

FOREIGN PATENT DOCUMENTS

EP    1227539 A1    7/2002

(Continued)

OTHER PUBLICATIONS

European Search Report—EP11156396—Search Authority—The Hague—Mar. 23, 2011.

(Continued)

*Primary Examiner* — Simon Nguyen
(74) *Attorney, Agent, or Firm* — Michelle Gallardo; Nicholas J. Pauley; Jonathan T. Velasco

(57) ABSTRACT

A MIMO wireless communications device supports a dual polarized mode of antenna operation and a single polarized mode of antenna operation. Antenna mode selection is performed as a function of signal to noise ratio information and/or rank information corresponding to a communications channel matrix. One of a communications device's processing chains is switched between first and second polarization orientation antennas, e.g., vertical and horizontally polarized antennas, as a function of the antenna mode selection. In various embodiments, the dual polarized mode is advantageously used for high SNR users, while in the low SNR regime, where the capacity is limited by received power, the single polarized antenna configuration, sometimes referred to as the spatial MIMO configuration, is used.

38 Claims, 8 Drawing Sheets

U.S. PATENT DOCUMENTS

2011/0096851 A1* 4/2011 Clerckx et al. .............. 375/259

FOREIGN PATENT DOCUMENTS

| | | |
|---|---|---|
| EP | 2034623 A1 | 3/2009 |
| JP | 8065225 A | 3/1996 |
| JP | 2002290148 A | 10/2002 |
| JP | 2003134013 A | 5/2003 |
| JP | 2006254112 A | 9/2006 |
| WO | WO9749199 A2 | 12/1997 |
| WO | WO2004015887 A1 | 2/2004 |

OTHER PUBLICATIONS

International Search Report and Written Opinion—PCT/US2009/034052, International Search Authority—European Patent Office—Sep. 12, 2009.

Lee, Wcy et al: "Polarization diversity system for mobile radio" IEEE Transactions on Communications, vol. COM-20, No. 5, Oct. 1, 1972, pp. 912-923, XP002035417.

* cited by examiner

METHODS AND APPARATUS FOR USING MULTIPLE ANTENNAS HAVING DIFFERENT POLARIZATION

FIELD

Various embodiments relate to wireless communications devices, and more particularly, to methods and apparatus for supporting dual and single polarization modes of operation in a communications device.

BACKGROUND

The importance of using multiple antennas in multiple input multiple output systems (MIMO) has been well understood. However, much focus has been on using vertically polarized spatial antenna array configurations.

Although spatial MIMO configurations have proven to be quite effective, a number of problems still exist with such spatial configurations. Most cellular propagation scenarios are characterized by the existence of a strong dominant path causing the spatial MIMO channel matrix to be rank deficient. Furthermore, an inter element spacing requirement in spatial configurations restricts the amount of permissible scaling down of a mobile device, as one attempts to make a mobile device more and more compact. Also, the interference resulting due to spatial antenna arrays is much higher as compared with the interference between a vertically polarized antenna and a horizontally polarized antenna. Thus, for one or more of the above reasons, there can be advantages in implementing an approach of using differently polarized antennas over an approach of using spatial antenna array with a single polarized antenna direction.

In view of the above discussion, it would be desirable if improved methods and apparatus could be developed to improve user experience in propagation scenarios characterized by a strong dominant path, without compromising compactness and size of mobile devices and without adding too much complexity to the current system in use.

SUMMARY

Methods and apparatus for operating a communications device capable of using single and dual polarization modes of antenna operation are described.

Polarization diversity refers to the signaling strategy whereby, information signals are transmitted and received simultaneously on orthogonally polarized waves. In one exemplary embodiment, a communications device employs dual polarized antennas with collocated orthogonally polarized elements to yield compact array configuration at the base station and/or at the mobile station. Such a dual polarized antenna configuration provides at least two degrees of freedom, even in propagation scenarios with a strong dominant component. Also, it achieves low correlation between the elements of a MIMO channel matrix, while having a compact array configuration.

Various embodiments are directed to a wireless communications device in which, an antenna selection technique has been adopted so that a judiciously chosen subset of antennas are used by the device. The device switches between a dual polarized mode of operation and a single polarized mode of operation. In some embodiments, the selection between the dual polarized mode of operation and the single polarized mode of operation is based on a channel quality estimate, e.g., an SNR measurement, rank information and/or a channel quality indicator value, or is in response to an antenna mode indicator signal. In some, but not necessarily all embodiments, when dual polarization mode is used different data is communicated over each of the differently polarized antennas, e.g., with each polarization operating as a different communications pipe through which data may be sent. In the single polarized mode of operation, in some embodiments, the same data is transmitted using two or more antenna elements having the same polarization. In the single polarized mode of operation, in some embodiments, the antenna elements operate together to support a data pipe corresponding to a single polarization between the sending and receiving devices. Alternatively, in some embodiments, two different data streams are communicated in the single polarized mode of operation from the different antennas, when the channel matrix is rank 2, indicating that the two streams can be separated at the receiver.

A communications device, e.g., an access node such as a base station or a wireless terminal such as a mobile node, in accordance with various embodiments, comprises: a first antenna element polarized in a first direction; a second antenna element polarized in a second direction, said first and second directions being different by at least 45 degrees; a first signal processing module coupled to said first antenna element; and a second signal processing module coupled to said second antenna element. An exemplary method of operating a wireless communications device, e.g., an access node or wireless terminal, in accordance with various embodiments comprises: operating during a first period of time in a dual polarized mode of antenna operation; and operating during a second period of time in a single polarized mode of antenna operation, said first and second periods of time being different.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION OF THE FIGURES

Figure 1:
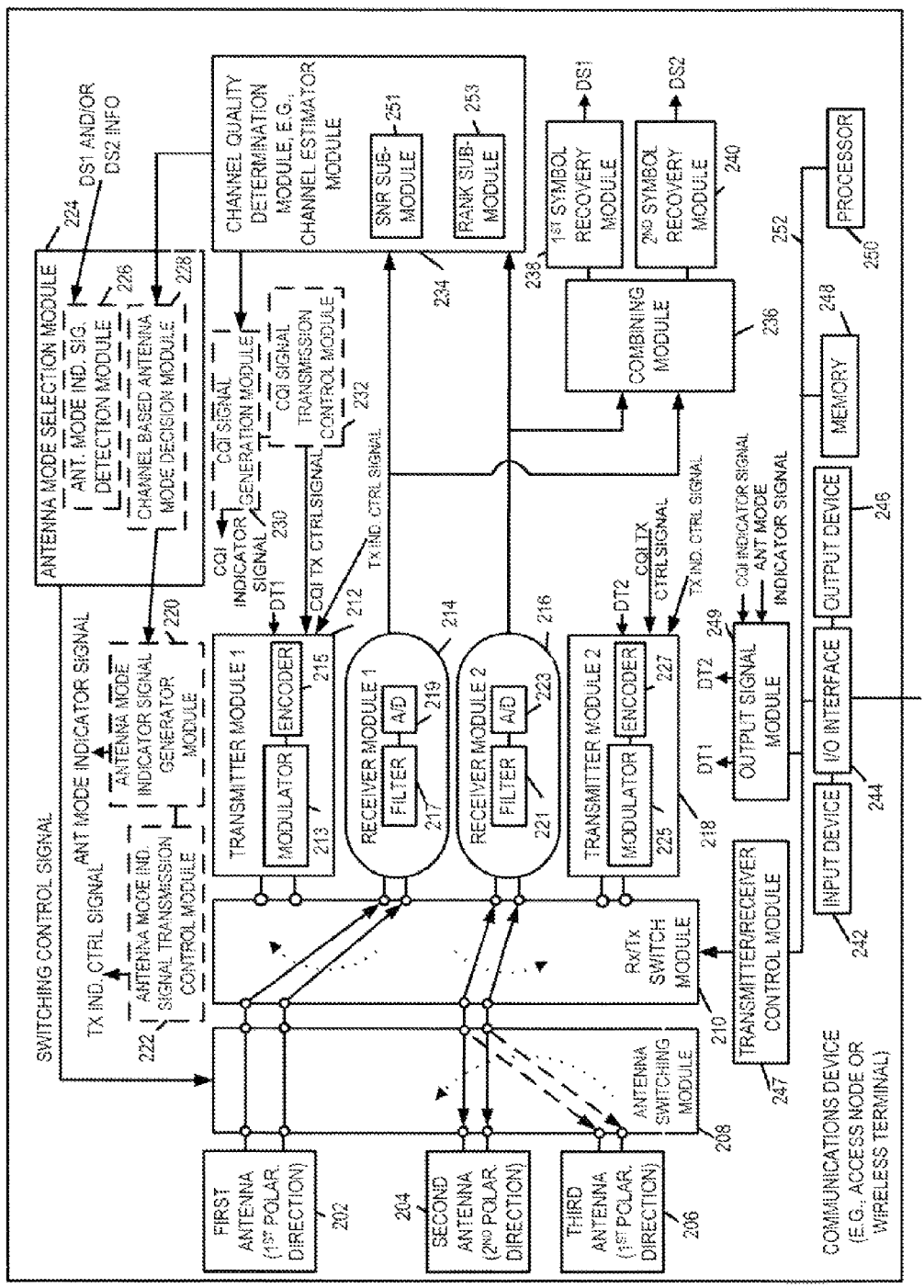
FIG. 1 illustrates an exemplary communications device as implemented in accordance with various embodiments.

FIG. 1 illustrates an exemplary communications device 200 as implemented in accordance with various exemplary embodiments. Exemplary communications device 200 is, e.g., an access node such as a base station or a wireless terminal such as a mobile node. A wireless terminal is sometimes referred to as an access terminal or an end node. The wireless communications device 200 includes a first antenna 202, a second antenna 204, a third antenna 206, an antenna switching module 208, a Receive/Transmit (Rx/Tx) switch module 210, a first transmitter module 212, a first receiver module 214, a second transmitter module 218, a second receiver module 216, an antenna mode selection module 224, a channel quality determination module 234, e.g., a channel estimator module to estimate channel quality, a combining module 236, a first symbol recovery module 238, a second symbol recovery module 240, an input device 242, an Input/Output (I/O) interface 244, an output device 246, a processor 250, a memory unit 248, a transmitter/receiver control module 247, and an output signal module 249. The I/O interface 244 is coupled to an input device 242, e.g., keypad, microphone, camera, keyboard, mouse, etc., and output device 246, e.g., display, speaker, etc., which can be used by a user to interact with the communications device 200. In some embodiments, multiple individual antennas are described as being used; it should be appreciated that alternatively that a single antenna assembly with multiple antenna elements may be used, instead of individual distinct antennas. For example, a first antenna element polarized in a first direction, a second antenna element polarized in the second direction, and a third antenna element polarized in the first direction, which are part of an antenna assembly, are used in some embodiments.

Transmitter module 1 212 includes an encoder 215 and a modulator 213. Encoder module 215 processes DT1 information, e.g., bits of information representing user data, control signals, etc., generating encoded bits which are used by modulator 213 to generate symbols to be transmitted. Transmitter module 2 218 includes an encoder 227 and a modulator 225. Encoder module 227 processes DT2 information, e.g., bits of information representing user data, control signals, etc., generating encoded bits which are used by modulator 225 to generate symbols to be transmitted. Receiver module 1 214 includes a filter 217 and an analog to digital converter 219. Filter 217 filters out undesired frequencies and noise and then A/D converter 219 converts the filtered analog signal to a digital signal. Receiver module 2 216 includes a filter 221 and an analog to digital converter 223. Filter 221 filters out undesired frequencies and noise and then A/D converter 223 converts the filtered analog signal to a digital signal.

I/O interface 244, processor 250, memory 248, output signal module 249, and a transmitter/receiver control module 247 are coupled together via a bus 252 via which the various elements may interchange data and information. Memory 248 includes routines and data/information. The processor 250, e.g., a CPU, executes the routines and uses the data/information in memory 248 to control the operation of the communications device 200 and implement methods, e.g., the method of flowchart 100 of FIG. 2 or the method of flowchart 300 of FIG. 3.

In some but not necessarily all embodiments, the communications device 200 may have a channel quality indicator (CQI) signal generation module 230 coupled to a channel quality information transmission control module 232. In various embodiments, the communications device includes an antenna mode indicator signal generation module 220 coupled to an antenna mode indicator signal transmission control module 222. In some embodiments, the I/O interface 244 has a connection for coupling the communications device 200 to other devices, e.g., by a wired or fiber optic connection.

In various embodiments, the antenna mode selection module 234 includes one or more of an antenna mode indicator signal detection module 226 and a channel based antenna mode decision module 228. Antenna mode indicator signal detection module 226 is for detecting receipt of an antenna mode indicator signal and for recovering information indicating one of a dual polarized mode of operation and a single polarized mode of operation.

The first antenna 202 which is polarized in a first direction, e.g. the vertical direction, is coupled to the antenna switching module 208. The second antenna 204 which is polarized in a second direction, e.g. the horizontal direction, is also coupled to the antenna switching module 208. Third antenna 206 which is polarized in the first direction is also coupled to the antenna switching module 208. Switching between the second antenna 204 and the third antenna 206 is performed by the antenna switching module 208 as a function of a switching control signal from the antenna mode selection module 224. Thus, antenna switching module 208 is used to couple the second and third antennas (204, 206) to a signal processing module, e.g., receiver module 2 216 or transmitter module 2 218, and the antenna switching module 208 selectively passes signals between one of: i) the second antenna 204 and ii) the third antenna 206 and the signal processing module at any given time.

The first and second directions are different from each other by at least 45 degrees. In some embodiments, the first and second directions are substantially orthogonal. In various embodiments, the first direction is a vertical direction and the second direction is a horizontal direction.

The Rx/Tx switch module 210 couples the antenna switching module to either the transmitter modules (212, 218) or to the receiver modules (214, 216) as a function of a control signal from the transmitter/receiver control module 247. With regard to the first antenna 202, the antenna switching module 208 and the RX/TX switch module 210, in combination, couple the first antenna 202 to either transmitter module 1 212 or receiver module 1 214.

The second antenna 204 or third antenna 206, whichever at a given time is selected via antenna switching module 208, is coupled, via RX/TX switch module 210 to one of receiver module 2 216 or transmitter module 2 218 as a function of the control signal from transmitter/receiver control module 247.

Consider that the first antenna 202 is coupled to receiver module 1 214, which is a signal processing module, and that the second antenna 204 is coupled to receiver module 2 216, which is another signal processing module, the receiver modules (214, 216) are used for recovering data from first and second received signals having the same frequency but different polarization. Alternatively, consider that the first antenna 202 is coupled to the transmitter module 1 212, a signal processing module, and that the second antenna 204, is coupled to transmitter module 2 218, another signal processing module, the transmitter modules (212, 218) are used for generating first and second signals having the same frequency to be transmitted with different polarizations.

For some embodiments, the communications device 200 sends pilot signals via the first polarization direction antennas, antenna 202 and 206, e.g., the vertical polarization antennas, over the air link using the first and second transmitter modules 212 and 218, respectively. For example, in one such embodiment, communications device 200 is an access node such as a base station which sends pilots signals to a wireless terminal such as mobile node to facilitate channel estimation upon which an initial selection between a dual and single mode of polarization operation is based. In various embodiments, the access node transmits pilot signals over a selected antenna irrespective of the mode of operation. For example, when in single polarization mode device 200, e.g., an access node, sends pilot signals over first antenna 202 and third antenna 206, while in dual polarization mode, the communications device 200, e.g., an access node, sends pilot signals over the first antenna 202 and second antenna 204. Such transmitted pilot signals, can be, and in some embodiments, are utilized in determining whether or not to switch between single and dual polarization modes of operation.

Now consider an exemplary embodiment where the communications device 200 is, e.g., a wireless terminal such as a mobile node, sometimes referred to as an access terminal. For some embodiments, the receivers (214, 216) feed the received signals, e.g., received signals including received pilot signals, to the channel quality determination module 234, e.g., a channel estimator module, to estimate the channel quality. Channel quality determination module 234 generates channel quality indicators from received signals, and the channel quality indicators include a signal to noise ratio value. Other channel quality indicators include rank information for a channel matrix between transmitter antennas used to transmit to device 200 and receive antennas in device 200 having a polarization which is the same as the transmitter antennas. Other channel quality indicators include additional signal to noise ratios, e.g., a separate signal to noise rate for each transmit antenna/receive antenna pair. In some embodiments, channel quality estimation operations performed by channel quality determination module, e.g., channel estimator module 234, includes determining a plurality of signal to noise ratios (SNRs), computing rank information corresponding to a communications channel matrix, and/or determining other channel estimation information.

Channel quality determination module 234, e.g., an estimator module, includes an SNR sub-module 251 and a rank sub-module 253. SNR sub-module 251, of channel estimator module 234, performs SNR measurements, e.g., corresponding to individual feeds from a receiver module corresponding to individual communications channels. Rank sub-module 253 of channel estimator module 234, determines rank information, e.g., a rank value, for a communications channel matrix corresponding to signals from both receiver module 1 214 and receiver module 2 216.

The channel quality determination module 234 is coupled to receiver modules (214, 216), via which module 234 receives input signals for evaluation. In some embodiments, the channel determination module 234 is also coupled to the channel based antenna mode decision module 228 of the antenna mode selection module 224. In some such embodiments, the channel based antenna mode decision module 228 uses channel estimation information, e.g., SNR and/or rank information, from channel estimator module 234 and decides whether communications device 200 is to be operating in a single polarization mode of operation or a dual polarization mode of operation. A decision signal from decision module 228 is fed to antenna mode indicator signal generator module 220, which generates an antenna mode indicator signal to be conveyed to the device communicating with device 200. The antenna mode indicator signal generation module 220 is also coupled to antenna mode indicator signal transmission control module 222 which generates a transmission indicator control signal used to control transmitter module 1 212 and/or transmitter module 2 218 to transmit the generated antenna mode indicator signal.

The antenna mode selection module 224 includes one or more of antenna mode indicator signal detection module 226 and a channel based antenna mode decision module 228. The antenna mode selection module 224 makes the decision as to which mode the device will operate in, i.e. either (i) the single polarized mode of antenna operation where only first direction polarized antennas, e.g., vertically polarized antennas, are used to send and/or receive signals and data or (ii) the dual polarized mode of antenna operation where both, a first and second direction polarized antennas, e.g., a horizontally polarized antenna and a vertically polarized antenna, are used to send and/or receive signals and data. When the dual polarized mode of operation is selected by module 224, the antenna switching module 208 is controlled to couple the second antenna 204 to a second signal processing module, e.g., receiver module 2 216 or transmitter module 2 218. When the single polarized mode of operation is selected by module 224, the antenna switching module 208 is controlled to couple the third antenna 206 to a second signal processing module, e.g., receiver module 2 216 or transmitter module 2 218. Thus in dual polarized mode signals over the first and second antennas (202, 204) are used to support communications, while in the single polarized mode signals over the first and third antennas (202, 206) are used to support communications.

In some embodiments the decision of antenna mode of operation is made by the antenna mode selection module 224 based on the channel quality information as provided by the channel estimator in the form of SNRs and/or rank. In such embodiments, the channel based antenna mode decision module 228 is responsible for the decision making. In some embodiments, the antenna mode selection module 224 selects the dual polarized mode of operation when the channel quality estimate indicates a first channel quality and selects the single polarized mode of operation when the channel quality estimate indicates a second quality which is lower than the first quality.

In one such embodiment, the channel based antenna mode decision module is coupled to an antenna mode indicator signal generation module 220. The antenna mode indicator signal generation module 220 generates an indicator signal indicating the selected antenna mode of operation, the selection being performed by device 200. The generated indicator signal is used to convey the mode decision of decision module 228. The generated indicator signal is input to the output signal module 249. The output signal module 249 generates data for transmission over receiver 1 (DT1) and data for transmission over receiver 2 (DT2), which is input to the transmitter modules (212, 218), respectively. As an example, consider the case where communications device 200 is a wireless terminal, and device 200 makes antenna mode selection decisions as a function of channel estimation information and communicates its decision via an indicator signal to an access node. The indicator signal indicates one of dual polarized antenna mode and single polarized antenna mode.

In some embodiments, the channel quality determination module 234, e.g., an estimator module, is coupled to a channel quality indicator (CQI) signal generation module 230, which is coupled to a channel quality information signal transmission control module 232. Channel quality determination module 234 estimates channel quality obtaining SNR information, rank information, and/or information based on SNR information and/or rank information. Such information is forwarded to the CQI signal generation module 230 which generates a CQI indicator signal. The generated CQI indicator signal is an input to output module 249 which generate DT1 information and DT2 information, which is an input to transmitter modules (212, 218), respectively. CQI signal transmission control module 232 generates a CQI transmission control signal which is used to control the transmitter modules (212, 218) to transmit the generated CQI control signal. Thus channel quality information transmission control module 232 controls transmission of channel quality information, said channel quality information including a signal to noise ratio value and one of: i) rank information for a channel matrix between transmitter antenna used to transmit to device 200 and receive antenna included in device 200 having a polarization which is the same as the transmitter antennas and ii) additional signal to noise ratio information. As an example, consider the case where communications device 200 is a wireless terminal, and device 200 estimates channel quality information, generates a channel quality indicator signal which it communicates to an access node, e.g., a base station. The access node uses the received channel quality indicator signal from communications device 200, e.g., wireless terminal 200, and the access node makes the decision as to the antenna mode of operation to be used by the communications device 200.

In some embodiments the antenna mode decision is made by the antenna mode selection module 224 based on the detection of an antenna mode indicator signal, as detected by the antenna mode indicator signal detection module 226. For example, consider an example, where communications device 200 does not make the decision as to the antenna mode of operation, but rather implements a decision made at a device which is remote to itself. For example, consider that communications device 200 is a wireless terminal and the device which makes the antenna mode decision is a base station, which transmits an antenna mode indicator signal to device 200. The signal is received via receiver modules (214, 216), subsequently processed by modules (236, 238 and 241) and detected by detection module 226 of antenna mode selection module 224 which generates and sends a switching control signal to antenna switching module 208 to implement the mode decision of the base station.

Alternatively, in another example, communications device 200 is a base station, and the protocol used in the communications system is such that the wireless terminal makes the decision as to the antenna mode of operation and communicates the decision to the base station. Then, antenna mode indicator signal detection module 226 detects a wireless terminal antenna mode decision.

The Rx/Tx switch module 210, under control of transmitter/receiver control module 210 is used to select between the transmitter and receiver modules based on what operation is needed to be performed by the device 200 i.e. either transmission or reception. The Rx/Tx switch module 210 will perform the switching operation and will select between the receiver modules and the transmitter modules based on the control signal supplied to the switch by the Rx/Tx switching control module 247.

The first receiver module 214, processes the received signal from the first antenna 202 by operations including filtering the received signal for noise and interference using the filter 217. The filtered signal is then fed to A/D converter 219, in order to convert analog data into digital, for further data processing in digital domain. The second receiver module 216, processes the received signal from the second antenna 204 or third antenna 206 by operations including filtering the received signal for noise and interference using filter 221. The filtered signal 221 is then fed to A/D converter 223, in order to convert analog data into digital, for further data processing in digital domain. The digital output from, the first receiver module 214 and the second receiver module 216 is fed to the combining module 236 where the output from the two receivers is combined and then data streams are separated out and fed to the symbol recovery modules 238 and 240. Then data stream 1 (DS1) and data stream 2 (DS2) can be recovered from the symbol recovery modules (238, 240), respectively. In some embodiments, there is only a single data stream, in which case only on of the symbol recovery modules should be used.

Memory 248 which may be implemented as an exemplary memory unit 400 of FIG. 4, includes routines and data/information and will be discussed in detail further with respect to FIG. 4. The processor 250, e.g., a CPU, executes the routines and uses the data/information in the memory 248 to control the operation of the communications device 200 and implement methods, e.g., the method of flowchart 100 of FIG. 2 and/or the method of flowchart 300 of FIG. 3.

Figure 2:
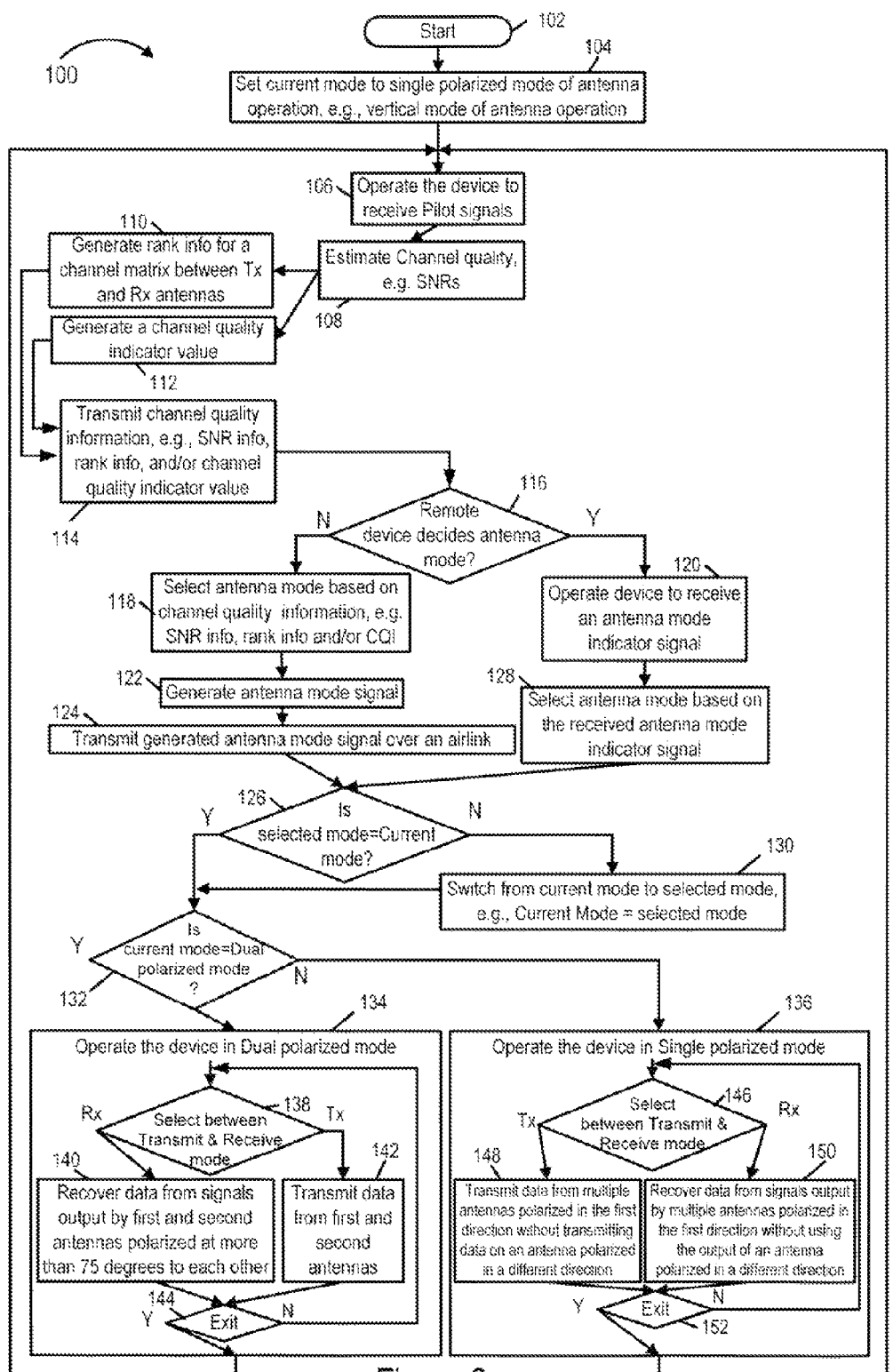
FIG. 2 illustrates a flowchart showing the steps of an exemplary method to operate a communications device in a selected mode of operation in accordance with an embodiment.

FIG. 2 illustrates a flowchart 100 showing the steps of an exemplary method to operate a communications device, e.g. the communications device 200 of FIG. 1. The communications device performing the method of flowchart 100 is, e.g., a wireless terminal such as mobile node. The communications device may be operated in either a single polarized mode of antenna operation or dual polarized mode of antenna operation. The exemplary method starts in step 102, where initialization is performed, and proceeds from start step 102 to step 104. In step 104, current mode of operation is set to the single polarized mode of antenna operation, e.g., vertical mode of antenna operation. In the single polarized mode of antenna operation, the antennas being used for communication are polarized in the same direction, e.g., two antenna used for communications, e.g., a first antenna and a third antenna, are vertically polarized. The operation proceeds from step 104 to step 106.

In step 106, the communication device is operated to receive pilot signals from a second device, e.g. a base station. While receiving pilots is shown as a separate step, step 106, the receipt of pilots may occur as part of the data mode of operation, e.g., as part of or in addition to sub-step 140 and/or sub-step 150. Step 106 may also include switching of the mode of operation, e.g., in order that pilots may be received in the mode of operation which is different than the previous mode of operation used for communicating data signals. The operation proceeds from step 106 to step 108. In step 108, communications device estimates channel quality, e.g., obtaining SNRs. For example, SNR sub-module 251 of channel quality determination module 234, e.g., a channel estimator module, of FIG. 1, determines SNRs corresponding to different channels. In step 108, the estimate of channel quality is based on one or more pilots received in a single polarized mode of operation. Optionally, pilots used during a dual mode of operation may be used to generate another one of multiple channel quality estimates that are generated in step 108 in some, but not necessarily all embodiments. Operation proceeds from step 108 to steps 110 and 112.

In step 110 the communications device generates rank information for a channel matrix between transmitter and receiver antennas. For example, rank sub-module 253 of channel quality termination module 234 computes a rank value for the channel matrix. In sub-step 112 the communications device generates a channel quality indicator value. For example, CQI signal generation module 230 of FIG. 1 generates a channel quality indicator signal. Operation proceeds from steps 110 and 112 to step 114.

In step 114, the communications device transmits the channel quality information, e.g., SNR information, rank information, and/or a channel quality indicator (CQI) value. Operation proceeds from step 114 to step 116.

In step 116 the communications device determines, e.g., based on an implemented protocol, whether or not a remote device gets to decide the antenna mode for the communications device implementing the method of flowchart 100. If a remote device does not get to decide the antenna mode for the communications device then operation proceeds from step 116 to step 118; otherwise, operation proceeds from step 116 to step 120.

In step 118, the communications device selects the antenna mode based on channel quality information, e.g., SNR information, rank information, and/or channel quality indicator information. In some embodiments, the communications device selects between the dual polarized mode of antenna operation and the single polarized mode of antenna operation based on both the channel quality estimate and generated rank information. Operation proceeds from step 118 to step 122, in which the communications device generates an antenna mode signal, and then in step 124 the communications device transmits the generated antenna mode signal over an airlink, e.g., to the base station which transmitted the received pilot signals of step 106. Operation proceeds from step 124 to step 126.

Returning to step 120, in step 120 the communications device is operated to receive an antenna mode indicator signal. Then, in step 128 the communications device selects the antenna mode for the communications device based on the received antenna mode indicator signal. Operation proceeds from step 128 to step 126.

In some embodiments, an alternative implementation is used in which the communications device monitors for an antenna mode indicator signal from a remote device. If the monitoring does not detect an antenna mode indicator signal from the remote device, then the communications device determines the antenna mode based on estimated channel quality information. However, if the communications device detects an antenna mode indicator signal, then the mode indicated by the received antenna mode indicator signal is the selected antenna mode. Thus, in such an embodiment, the communications device's default mechanism for selecting antenna mode is its own estimation of channel quality information; however, received mode indicator signals can, and sometimes do, serve as an override or higher priority mechanism used to select antenna mode.

Returning to step 126, step 126 is a decision making step and in step 126 the communications device determines if the selected mode of operation, from step 118 or step 128, is the current mode in which the communications device is operating. If it is determined that the selected mode happens to be the current mode, the operation proceeds from step 126 to step 132. If the selected mode is not same as current mode of operation then operation proceeds from step 126 to step 130.

In step 130, the communications device switches from its present current mode of operation to selected mode of operation, and the operation proceeds to step 132. Thus in step 130, the current mode is updated: current mode (updated)=selected mode (of step 118 or 128). In various embodiments, switching the current mode to the selected mode includes commanding an antenna switching module, e.g., antenna switching module 208 of FIG. 1, to change switch position. In some embodiments, switching is performed at specific points in time within a predetermined timing structure at which the wireless communications device is permitted to switch between the dual polarized mode of operation and the single polarized mode of operation.

Step 132 is also a decision making step and in this step the communications device determines if the current mode of operation is a dual polarized mode of antenna operation. Thus in step 132 the communications device proceeds differently depending upon whether the current mode of operation is a dual polarized mode of operation or a single polarized mode of operation. If the answer to the decision making step 132 is yes, then operation proceeds from step 132 to step 134. However, if the answer to the decision making step 132 is no, then operation proceeds from step 132 to step 136.

In step 134, the communications device is operated in dual polarized mode of antenna operation. In this mode of operation one of the antennas used, e.g. first antenna 202 of FIG. 1, is polarized in the first polarization direction, e.g., the vertical direction, and another antenna used, e.g. second antenna 204 of FIG. 1, is polarized in the second polarization direction e.g., the horizontal direction. Step 134 includes sub-steps 138, 140, 142 and 144. In sub-step 138, the communications device selects between transmit and receive mode. If the selection of decision step 138 is receive mode then operation proceeds from sub-step 138 to sub-step 140; however, if the decision of sub-step 138 is to transmit, then operation proceeds from sub-step 138 to sub-step 142. In sub-step 138, the communications device recovers data from signals output from the first and second antennas, which are polarized at more than 75 degrees with respect to each other. In sub-step 142, the communications device transmits data from the first and second antennas. Operation proceeds from sub-step 140 or 142 to sub-step 144. In sub-step 144 the communications device decides whether it should loop back to make another receive/transmit decision in the dual polarized mode or whether it should exit and go back and reconsider its mode of operation. If it decides in sub-step 144 to exit, then operation proceeds from step 134 to step 106. However, if the decision in sub-step 144 is not to exit, then operation proceeds from sub-step 144 to sub-step 138. In some embodiments, the exit decision of sub-step 144 is based upon time. In some such embodiments, the allowable rate of mode switching between dual polarized antenna mode and single polarized antenna mode is less than the allowable rate of switching between receive and transmit modes of operation.

Returning to step 136, in step 136, the communications device is operated in the single polarized mode of antenna operation. In this mode of operation, multiple antennas being used for communication are polarized in same direction, e.g. both the first antenna 202 of FIG. 1 which is used, is polarized in the first, e.g., vertical, direction and another antenna, e.g. third antenna 206 of FIG. 1, is also polarized in the same first, e.g., vertical, direction, without using other antennas which are polarized in a different direction. For example, the second antenna 204 of FIG. 1 which is polarized in a second direction, e.g., the horizontal direction, is not used in the single polarized mode of operation.

Step 136 includes sub-steps 146, 148, 150 and 152. In sub-step 146, the communications device selects between transmit and receive modes. If the selection of decision step 138 is receive mode then operation proceeds from sub-step 146 to sub-step 150. However, if the decision of sub-step 146 is to transmit, then operation proceeds from sub-step 146 to sub-step 148. In sub-step 150, the communications device recovers data from signals output from multiple antennas polarized in the first direction without using the output of an antenna polarized in a different direction. For example, with regard to FIG. 1, communications device 200 recovers data received via first and third antenna (202, 206), respectively, but does not use the output of second antenna 204. In sub-step 148, the communications device transmits data from multiple antennas polarized in the first direction without transmitting data on an antenna polarized in a different direction. For example, with regard to device 200 of FIG. 1, signals are transmitted via first and third antennas (202, 206), polarized in the first, e.g., vertical direction, without transmitting via the second antenna 204 which is polarized in the second direction, e.g., horizontal direction. Operation proceeds from sub-step 148 or 150 to sub-step 152. In sub-step 152 the communications device decides whether it should loop back to make another receive/transmit decision in the single polarized mode or whether it should exit and go back and reconsider its mode of antenna operation. If it decides in sub-step 152 to exit, then operation proceeds from step 126 to step 106; However, if the decision in sub-step 152 is not to exit, then operation proceeds from sub-step 152 to sub-step 146. In some embodiments, the exit decision of sub-step 152 is based upon time. In some such embodiments, the allowable rate of mode switching between dual polarized antenna mode and single polarized antenna mode is less than the allowable rate of switching between receive and transmit modes of operation.

Figure 3:
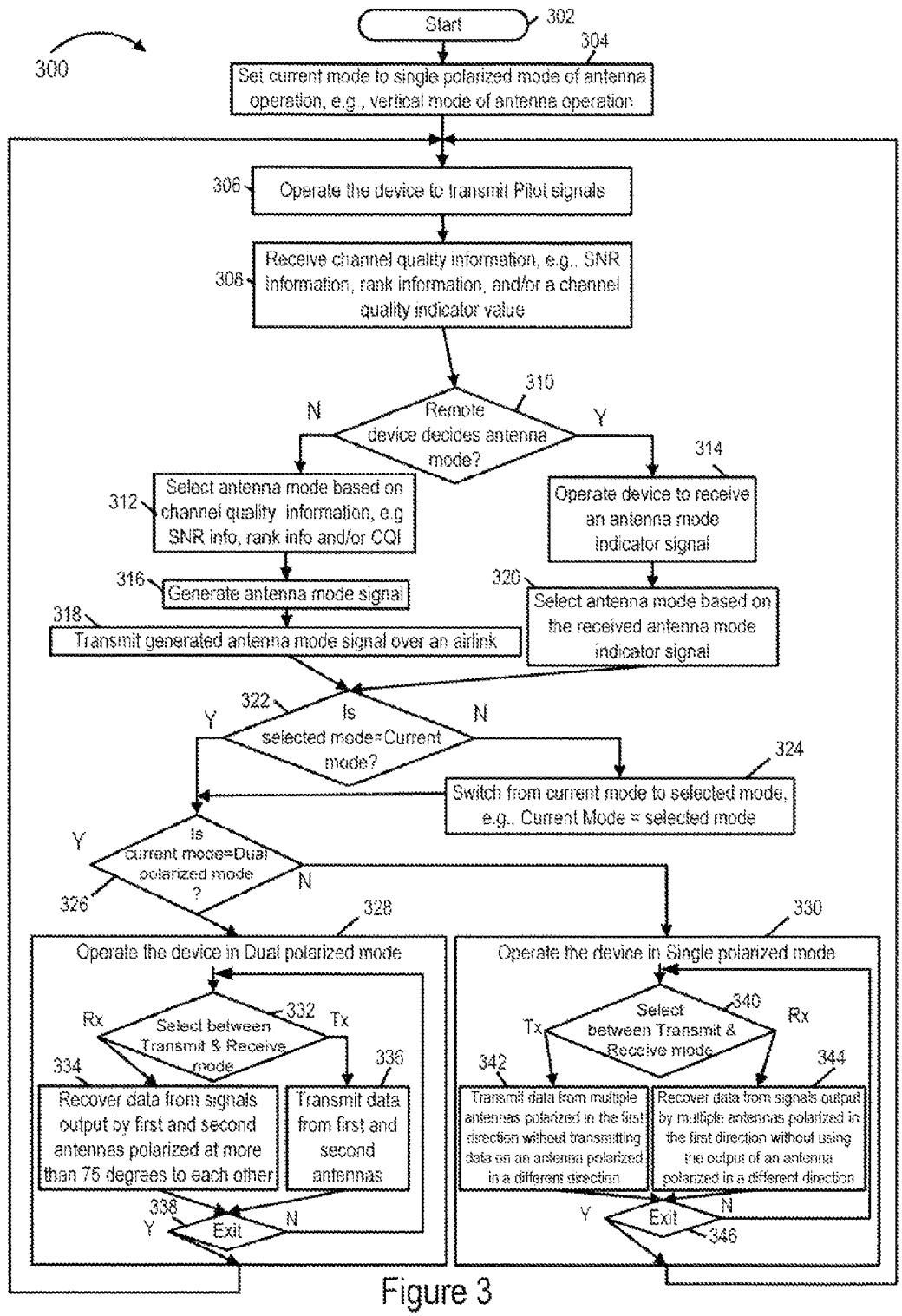
FIG. 3 illustrates a flowchart showing the steps of an exemplary method to operate a communications device in a selected mode of operation in accordance with yet another embodiment.

FIG. 3 illustrates a flowchart 300 showing the steps of an exemplary method to operate a communications device, e.g., the communications device 200 of FIG. 1. The communications device performing the method of flowchart 300 is, e.g., an access node such as a base station. The communications device may be operated in either a single polarized mode of antenna operation or dual polarized mode of antenna operation. The exemplary method starts in step 302, where initialization is performed, and proceeds from start step 302 to step 304. In step 304, current mode of operation is set to the single polarized mode of antenna operation, e.g., vertical mode of antenna operation. In the single polarized mode of antenna operation, the antennas being used for communication are polarized in the same direction, e.g., two antenna used for communications, e.g., a first antenna and a third antenna, are vertically polarized. The operation proceeds from step 304 to step 306.

In step 306, the communication device is operated to transmit pilot signals to a second device, e.g. to a wireless terminal using the communications device, e.g., base station, as a point of attachment. The operation proceeds from step 306 to step 308. In step 308, communications device receives channel quality information, e.g., SNR information, rank information, and/or a channel quality indicator value. For example, multiple SNRs corresponding to different channels are received. As another example, rank information for a channel matrix between transmitter and receiver antennas is received. As still another example, a channel quality indicator value is received. Operation proceeds from step 308 to step 310.

In step 310 the communications device determines, e.g., based on an implemented protocol, whether or not a remote device gets to decide the antenna mode for the communications device implementing the method of flowchart 300. If a remote device does not get to decide the antenna mode for the communications device then operation proceeds from step 310 to step 312; otherwise operation proceeds from step 310 to step 314.

In step 312, the communications device selects the antenna mode based on channel quality information, e.g., SNR information, rank information, and/or channel quality indicator information. In some embodiments, the communications device makes a selection between the dual polarized mode of antenna operation and the single polarized mode of antenna operation based on both a channel quality estimate and rank information. Operation proceeds from step 312 to step 316, in which the communications device generates an antenna mode signal, and then in step 318 the communications device transmits the generated antenna mode signal over an airlink, e.g., to the wireless terminal which transmitted the received channel quality information of step 308. Operation proceeds from step 318 to step 322.

Returning to step 314, in step 314 the communications device is operated to receive an antenna mode indicator signal. Then, in step 320 the communications device selects the antenna mode for the communications device based on the received antenna mode indicator signal. Operation proceeds from step 320 to step 322.

In some embodiments, an alternative implementation is used in which the communications device monitors for an antenna mode indicator signal from a remote device. If the monitoring does not detect an antenna mode indicator signal from the remote device, then the communications device determines the antenna mode based on received channel quality information. However, if the communications device detects an antenna mode indicator signal, then the mode indicated by the received antenna mode indicator signal is the selected antenna mode. Thus, in such an embodiment, the communications device's default mechanism for selecting antenna mode is its own determination based on received channel quality information; however, received mode indicator signals can, and sometimes do, serve as an override or higher priority mechanism used to select antenna mode.

Returning to step 322, step 322 is a decision making step and in step 322 the communications device determines if the selected mode of operation, from step 312 or step 320, is the current mode in which the communications device is operating. If it is determined that the selected mode happens to be the current mode, the operation proceeds from step 322 to step 326. If the selected mode is not same as current mode of operation then operation proceeds from step 322 to step 324.

In step 324, the communications device switches from its present current mode of operation to selected mode of operation, and the operation proceeds to step 326. Thus in step 324, the current mode is updated: current mode (updated)=selected mode (of step 312 or 320). In various embodiments, switching the current mode to the selected mode includes commanding an antenna switching module, e.g., antenna switching module 208 of FIG. 1, to change switch position. In some embodiments, switching is performed at specific points in time within a predetermined timing structure at which the wireless communications device is permitted to switch between the dual polarized mode of operation and the single polarized mode of operation.

Step 326 is also a decision making step and in this step the communications device determines if the current mode of operation is a dual polarized mode of antenna operation. Thus in step 326 the communications device proceeds differently depending upon whether the current mode of operation is a dual polarized mode of operation or a single polarized mode of operation. If the answer to the decision making step 326 is yes, then operation proceeds from step 326 to step 328. However, if the answer to the decision making step 326 is no, then operation proceeds from step 326 to step 330.

In step 328, the communications device is operated in dual polarized mode of antenna operation. In this mode of operation one of the antennas used, e.g. first antenna 202 of FIG. 1, is polarized in the first polarization direction, e.g., the vertical direction, and another antenna used, e.g. second antenna 204 of FIG. 1, is polarized in the second polarization direction, e.g., the horizontal direction. Step 328 includes sub-steps 332, 334, 336 and 338. In sub-step 332, the communications device selects between transmit and receive mode. If the selection of decision step 332 is receive mode then operation proceeds from sub-step 332 to sub-step 334; however, if the decision of sub-step 332 is to transmit, then operation proceeds from sub-step 332 to sub-step 336. In sub-step 334, the communications device recovers data from signals output from the first and second antennas, which are polarized at more than 75 degrees with respect to each other. In sub-step 336, the communications device transmits data from the first and second antennas. Operation proceeds from sub-step 334 or 336 to sub-step 338. In sub-step 338 the communications device decides whether it should loop back to make another receive/transmit decision in the dual polarized mode or whether it should exit and go back and reconsider its mode of operation. If it decides in sub-step 338 to exit, then operation proceeds from step 328 to step 306; However, if the decision in sub-step 338 is not to exit, then operation proceeds from sub-step 338 to sub-step 332. In some embodiments, the exit decision of sub-step 338 is based upon time. In some such embodiments, the allowable rate of mode switching between dual polarized antenna mode and single polarized antenna mode is less than the allowable rate of switching between receive and transmit modes of operation.

Returning to step 330, in step 330, the communications device is operated in the single polarized mode of antenna operation. In this mode of operation, multiple antennas being used for communication are polarized in same direction, e.g. both the first antenna 202 of FIG. 1 which is used, is polarized in the first, e.g., vertical, direction and another antenna, e.g. third antenna 206 of FIG. 1, is also polarized in the same first, e.g., vertical, direction, without using other antennas which are polarized in a different direction. For example, the second antenna 204 of FIG. 1 which is polarized in a second direction, e.g., the horizontal direction, is not used in the single polarized mode of operation.

Step 330 includes sub-steps 340, 342, 344 and 346. In sub-step 340, the communications device selects between transmit and receive mode. If the selection of decision step 340 is receive mode then operation proceeds from sub-step 340 to sub-step 344; however, if the decision of sub-step 340 is to transmit, then operation proceeds from sub-step 340 to sub-step 342. In sub-step 344, the communications device recovers data from signals output from multiple antennas polarized in the first direction without using the output of an antenna polarized in a different direction. For example, with regard to FIG. 1, communications device 200 recovers data received via first and third antenna (202, 206), respectively, but does not use the output of second antenna 204. In sub-step 342, the communications device transmits data from multiple antennas polarized in the first direction without transmitting data on an antenna polarized in a different direction. For example, with regard to device 200 of FIG. 1, signals are transmitted via first and third antennas (202, 206), polarized in the first, e.g., vertical direction, without transmitting via the second antenna 204 which is polarized in the second direction, e.g., horizontal direction. Operation proceeds from sub-step 342 or 344 to sub-step 346. In sub-step 346 the communications device decides whether it should loop back to make another receive/transmit decision in the single polarized mode or whether it should exit and go back and reconsider its mode of antenna operation. If it decides in sub-step 346 to exit, then operation proceeds from step 330 to step 306; However, if the decision in sub-step 346 is not to exit, then operation proceeds from sub-step 346 to sub-step 340. In some embodiments, the exit decision of sub-step 346 is based upon time. In some such embodiments, the allowable rate of mode switching between dual polarized antenna mode and single polarized antenna mode is less than the allowable rate of switching between receive and transmit modes of operation.

The flowchart of FIG. 3 has been described from the perspective of an exemplary access node, e.g., base station, which transmits pilot signals, and the flowchart of FIG. 2 has been described from the perspective of an exemplary wireless terminal, e.g., mobile node, which receives pilot signals. However, in some embodiments, the roles are reversed and the wireless terminal transmits uplink pilot signals which are received and used by the base station. It should also be appreciated that in some embodiments, the mode of antenna operation for an access node, e.g., base station refers to a connection with a particular wireless terminal, and in some such embodiments, from the access node's perspective, the access node, e.g., base station can be in a dual polarized mode of operation with regard to a first wireless terminal while being in a single polarized mode of operation with regard to a second wireless terminal.

Figure 4:
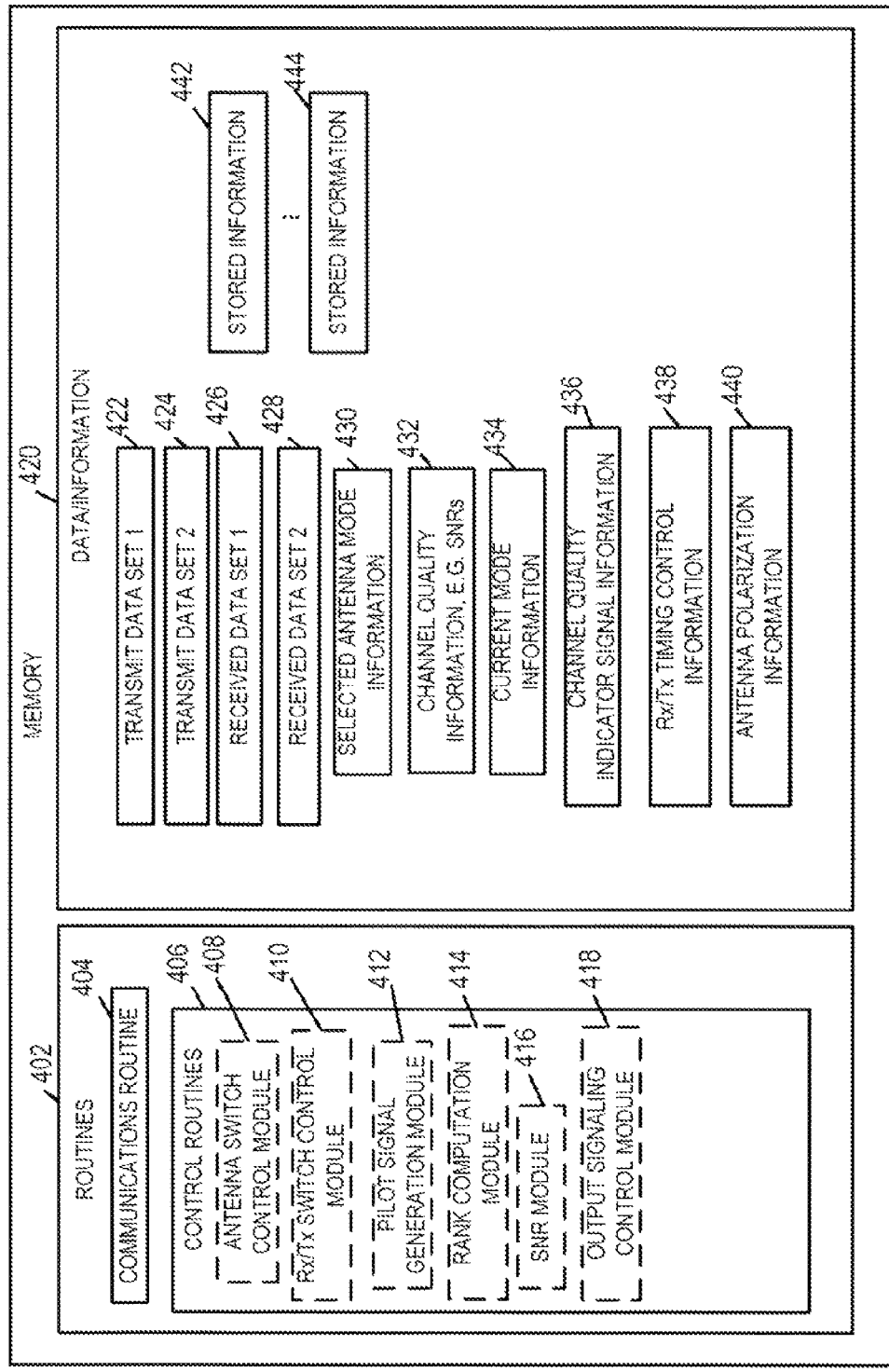
FIG. 4 illustrates an exemplary memory which may be used in the wireless communications device shown in FIG. 1.

FIG. 4 illustrates an exemplary memory 400 which may be memory 248 of wireless communications device 200 shown in FIG. 1. The memory unit 400 is coupled to other elements via a bus, e.g. bus 252 of FIG. 1, over which the various elements may interchange data and information. Memory unit 400 includes routines 402 and data/information 420. The routines 402 and the data/information 420 in memory unit 400 are used by a processor, e.g. a CPU, to control the operation of a communication device, e.g. control communications device 200 of FIG. 1, and implement methods, e.g., method of flowchart 100 of FIG. 2 or flowchart 300 of FIG. 3.

In some embodiments, some of the modules in memory 400 are used in place of a corresponding module shown in FIG. 1. For example, one embodiment may include SNR module 416 instead of SNR sub-module 251. In some embodiments, some of the modules shown in FIG. 1 are used in place of a corresponding module shown in FIG. 4. For example, one embodiment may use rank sub-module 253 instead of rank computation module 414. Thus some illustrated modules may represent alternative embodiments. In some embodiments, for at least some functions, a module shown in FIG. 1 operates in coordination with a corresponding module in memory 400 to perform a function or implement a step of a method. For example, in one embodiment, output signaling control module 418 works in conjunction with output signal module 249. Other modules shown in the example of FIG. 1, such as modules 222, 220, 224, 226, 228, 230, 232, 234, 236, 238, 240, 247, and/or 249, are, in some embodiments, replaced either wholly or in part by a module in memory. Thus the techniques, functions, and/or steps of methods of various embodiments may be implemented using software, hardware and/or a combination of software and hardware.

Routines 402 include a communications routines 404 and control routines 406. The communications routine 404 implements the various communications protocols used by the communication device including memory 400, e.g., communications device 200 of FIG. 1. Control routines 406 include, an antenna switch control module 408, an Rx/Tx switch control module 410, a pilot signal generation module 412, a rank computation module 414, an SNR module 416 and an output signaling control module 418. Data/information 420 includes transmit data set 1 422, transmit data set 2 424, received data set 1 426, received data set 2 428, selected antenna mode information 430, channel quality information 432, current mode information 434, channel quality indicator signal information 436, Rx/Tx timing control information 438, and antenna polarization information 440.

The antenna switch control module 408 is used, in some embodiments, to control the operation of an antenna switching module, e.g. antenna switching module 208 of FIG. 1. The antenna switch control module 408 controls the antenna switching operation based on the information provided by selected antenna mode information 430, which is an output of antenna mode selection module 224. When a certain mode of antenna mode is selected, the antenna switch control module 408 sends a command signal to the antenna switching module, e.g. switching module 208 of FIG. 1. Based on this control command, the antenna switching module 208 may select either first and second antennas or it may select first and third antennas. In some other embodiments, the antenna mode selection module 224 generates the switching control signal directly which it sends to the antenna switching module 208.

The Rx/Tx switch control module 410, in some embodiments, controls the operation of the Rx/Tx switch module 210. Based on the Rx/Tx timing control information 438, the Rx/Tx mode control module 408 sends a control signal to the Rx/Tx switching module 210, to switch between receiver and transmitter modules, e.g. receiver modules (214, 216) and transmitter modules (212, 218) of FIG. 1. The Rx/Tx switch control module may be omitted in some embodiments, for example in FDD embodiments.

The pilot signal generation module 412 generates the pilot signals to be transmitted from a first communication device to a second communication device. For example, consider that memory 400 is part of a base station, pilot signal generation module 412 generates pilot signals to be transmitted to a wireless terminal using the base station as a point of attachment.

Rank computation module 414 is implemented in the memory 400 to compute rank information for the channel matrix between transmitter antennas and receive antennas. The rank information is computed based on the channel quality information, e.g. SNR or multiple SNR values, interference level information, etc.

SNR module 416 determines SNRs corresponding to received signals, e.g., a first SNR corresponding to a first pair of antennas in a MIMO configuration and a second SNR corresponding to a second pair of antennas in a MIMO configuration.

Output signaling control module 418 controls the operation of output signal module 249, e.g., controlling embedding of channel quality indicator signals, antenna mode indicator signals, other control signals, and user data into data set 1 information and data set 2 information.

Data/information 420 includes a plurality of set of stored information, e.g. stored information set 442, indicating, e.g. base station ID, sector identification values associated with the various sectors of base station, antenna polarization information etc. Stored information set 444 may include similar information, e.g., corresponding to a different communications device. Data/information 420 further includes information as data set 1 to be transmitted 422, data set 2 to be transmitted 424, received data set 1 information 426, stored received data set 2 information 428, selected antenna mode information 430, channel quality information 432, e.g. SNRs, current mode information 434, i.e. the information about current mode of antenna operation in the communications device including memory 400, channel quality indicator signal information 436, Rx/Tx timing control information 438, i.e. information that controls as to when the communications device including memory 400 will transmit and when it will receive. Accordingly, the Rx/Tx switch control module 410 switches between available receiver and transmitter modules as a function of information 438. Data/information 420 also includes the antenna polarization information 436 which includes information characterizing and/or identifying polarization for each of the available antennas, e.g. first, second and third antennas of the device including memory 400, e.g., device 200 of FIG. 1.

Figure 5:
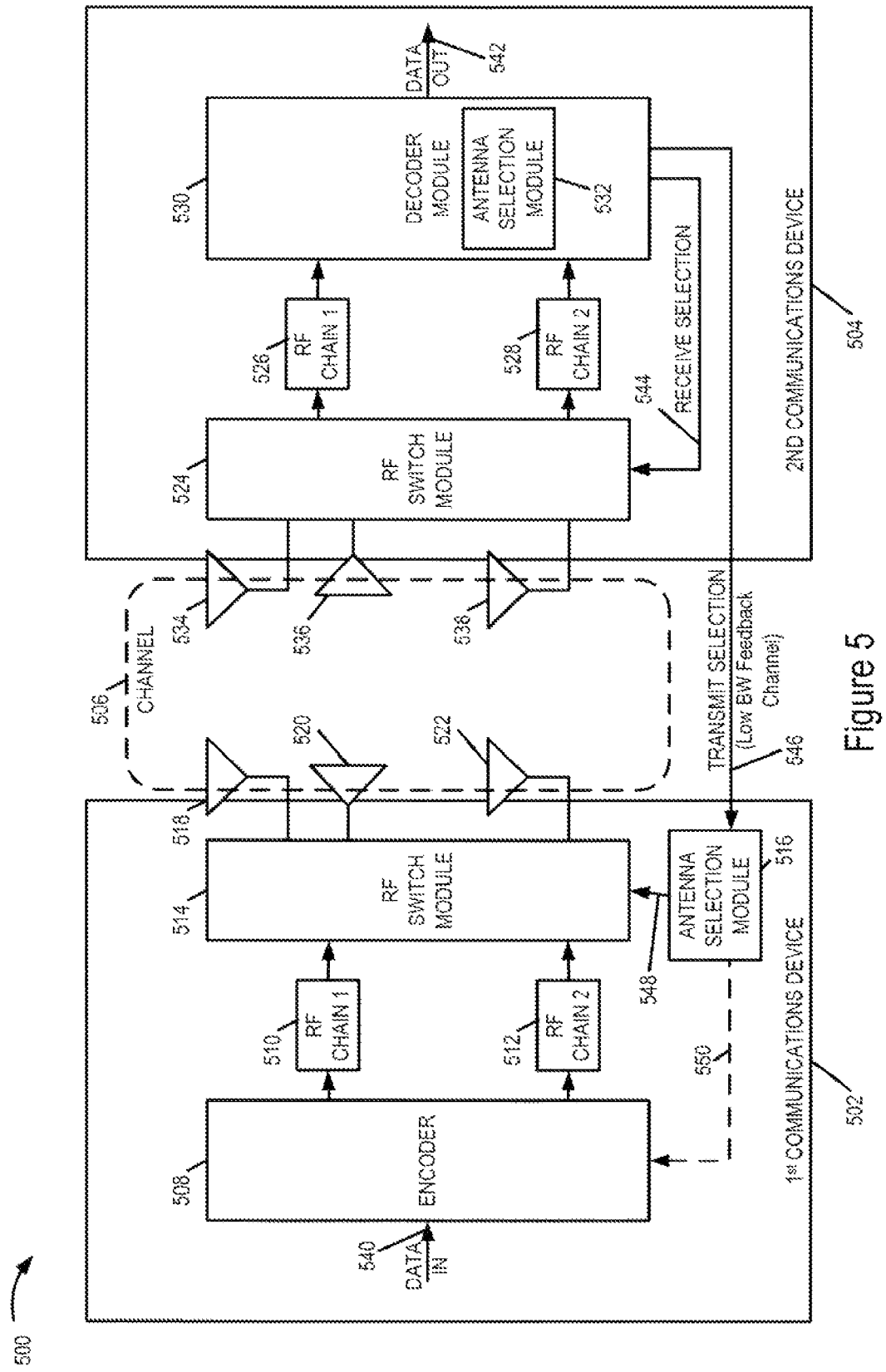
FIG. 5 is a drawing of an exemplary communications system including two wireless communications devices which support MIMO operations and antenna switching, each device including two antennas polarized in a vertical direction and an antenna polarized in a horizontal direction.

FIG. 5 is a drawing of an exemplary communications system 500 including two wireless communications devices (502, 504) which support MIMO operations and antenna switching, each device (502, 504) including two antennas polarized in a vertical direction and an antenna polarized in a horizontal direction. Exemplary first communications device 502 includes a $1^{st}$ antenna polarized in the vertical direction 518, a $2^{nd}$ antenna polarized in the horizontal direction 520 and a third antenna polarized in the vertical direction 522. Exemplary second communications device 504 includes a $1^{st}$ antenna polarized in the vertical direction 534, a $2^{nd}$ antenna polarized in the horizontal direction 536 and a third antenna polarized in the vertical direction 538.

First communications device 502 includes an encoder module 508 for encoding input data 540, a first RF chain 510, a $2^{nd}$ RF chain 512, an RF switch module 514 and an antenna selection module 516. Second communications device 504 includes an RF switch module 524, a first RF chain 526, a second RF chain 528 and a decoder module 530 including an antenna selection module 532.

A wireless channel 506 exists between first and second devices (502, 504). The wireless channel 506 may, and sometimes does, change over time as a function of wireless device positions, noise, interference, obstructions, weather conditions, etc.

The first and second communications devices (502, 504) may be in accordance with exemplary communications device 200 or a variation thereof. For example, with regard to $1^{st}$ communications device 502, encoder module 508 may be represented by output signal module 249 in FIG. 1, RF chain 1 510 may be represented by transmitter module 1 212 in FIG. 1, RF chain 2 512 may be represented by transmitter module 2 218 in FIG. 1, RF switch module 514 may be represented by antenna switching module 208 in FIG. 1, antenna selection module 516 may be represented by antenna mode selection module 224 including antenna mode indicator signal detection module 226 of FIG. 1, and antennas (518, 520, 522) may be represented by antennas (202, 204, 206) of FIG. 1.

Continuing with the example, with regard to the $2^{nd}$ communications device 504, antennas (534, 536, 538) may be represented by antennas (202, 204, 206), respectively of FIG. 1, RF switch module 524 may be represent by antenna switching module 208 of FIG. 1, RF chain 1 526 may be represented by receiver module 1 214 of FIG. 1, RF chain 2 528 may be represented by receiver module 2 216 of FIG. 1, decoder module 530 may be represented by the combination of: combining module 236, $1^{st}$ symbol recovery module 238, second symbol recovery module 240, channel quality determination module 234, antenna mode selection module 224 including channel based antenna mode decision module 228, and antenna mode indicator signal generation module 220 of FIG. 1.

In the example of FIG. 5, there is one input data stream 540 and one corresponding output data stream 542. In some embodiments, there are multiple, e.g., two, input data streams and two output data streams. While shown in the illustrated embodiment, with a single data input and data output, in other embodiments, multiple data input and data output streams are supported.

An exemplary strategy, used in this exemplary embodiment will now be described. Consider that FIG. 5 illustrates a 2×2 MIMO link. The first device 502, which is to transmit the data stream, includes two vertically polarized antennas (518, 522) and one horizontally polarized antenna 520. The second device 504, which is to recover the data stream, includes two vertically polarized antennas (534, 538) and one horizontally polarized antenna 536. Furthermore, the first device 502 includes two RF chains (510, 512) and the second device includes two RF chains (526, 528). The second device 504, which is the intended receiver, implements a selection methodology which selects the antennas to be used based on the observed SNR. If the SNR is greater than a predetermined threshold, the selection methodology implementation selects dual polarization mode. In other embodiments rank information is used in addition to the SNR information in making the mode selection decision. Commands are generated and sent to the RF switch module 524 of the receiver device 504 and to the RF switch module 514 of the $1^{st}$ device 502, to use the dual polarized configuration, e.g., antennas (536, 538) for the $2^{nd}$ device 504 and antennas (520, 522) for the $1^{st}$ device 502. Antenna selection module 532 makes the determination based on measured SNR information. Switching control signal 544 communicates the receive selection setting to RF switch module 524. Transmit selection signal 546, e.g., a generated antenna mode selection signal, is communicated from decoder module 530 to antenna selection module 516 which detects the signal and sends a switching control signal 548 to RF switch module 514. In some embodiments, a control signal 550 indicating the antenna mode selection is also sent to the encoder module 508 so that different encoding can be used as a function of antenna mode selection.

However, if the SNR falls below the threshold, the implemented methodology determines to command the first and second devices (502, 504) to switch to the spatial array configuration, by switching one of the RF chains from the horizontally polarized antenna to the currently idle vertically polarized antenna. For example, the switching results in the spatial array configuration in which the $1^{st}$ device 502 uses antennas (518 and 522) and idles antenna 520, and the second device 504 uses antennas (534 and 538) and idles antenna 536. The switching information is conveyed to the first device 502, which is the transmitter device with regard to the data stream, by means of a low bandwidth feedback channel (see signal 546). This strategy can be easily generalized to a higher order MIMO configuration.

Figure 6:
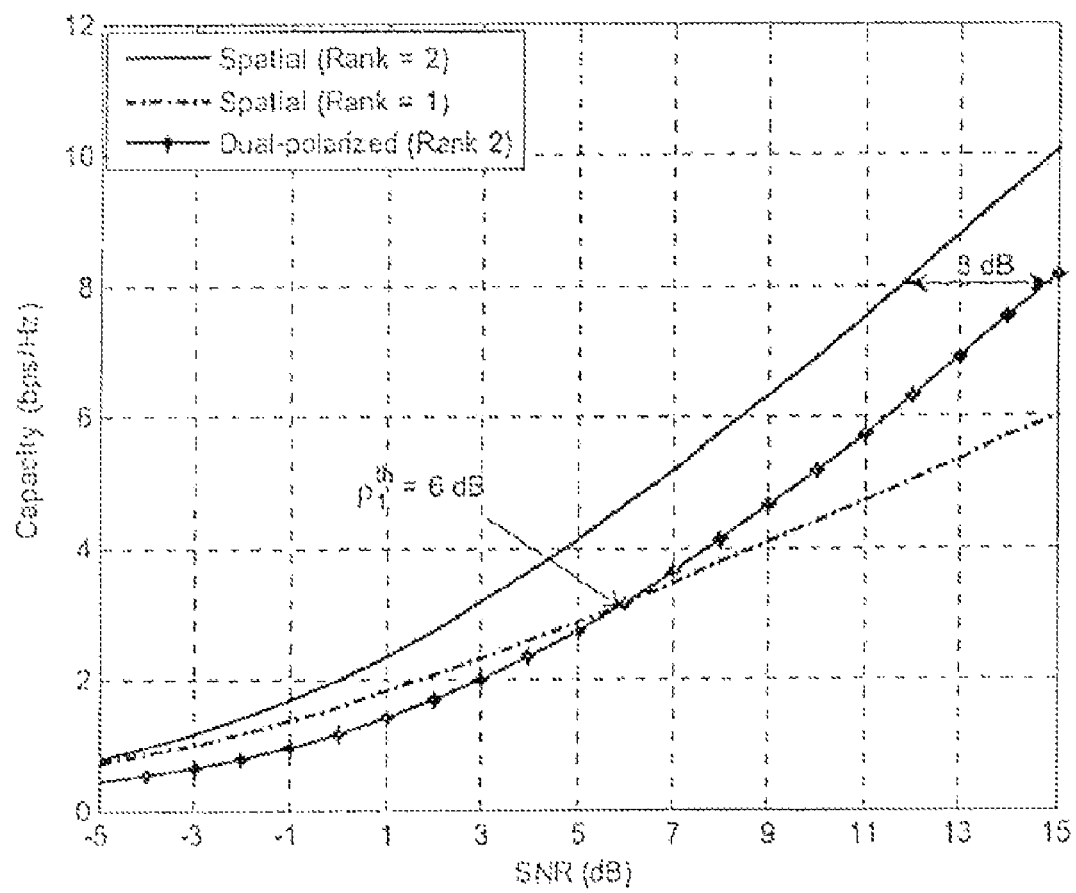
FIG. 6 is a drawing illustrating 2×2 MIMO capacity with spatial and dual polarized configurations.

The threshold SNR for the selection methodology can be, and sometimes is, selected based on the capacity. As shown in drawing 600 of FIG. 6, a dual polarized MIMO outperforms the rank deficient spatial MIMO channel for SNR>6 dBs for one exemplary considered configuration. In various embodiments, a back-off is applied to this value to account for implementation losses, when determining a threshold used for selecting between dual and single polarization modes of operation. In propagation scenarios, where the spatial MIMO channel achieves full rank or nearly full rank and is sufficiently de-correlated as shown in FIG. 6, the dual polarized MIMO configuration does not offer any benefit. The proposed strategy can be easily modified to accommodate these scenarios as well, e.g., by using determined rank information in the antenna selection decision.

The spatial MIMO configuration enjoys a power benefit over its dual polarized counterpart. This power benefit does not depend upon the inter-element spacing used to realize the antenna array. Thus, the two vertically polarized antennas on a mobile device do not need to be separated by a large distance.

In some embodiments, the proposed strategy is used to increase the capacity of high SNR users in a cellular network with only a nominal increase in complexity and cost. The capacity of high signal to noise ratio users is limited by the degrees of freedom whereas the capacity of low SNR users is limited by received signal power. Hence the dual polarized MIMO configuration is suitable for users in the high SNR regime whereas the spatial array configuration is preferred for the low SNR users. An exemplary proposed strategy selects the appropriate MIMO configuration depending on the operating SNR.

Figure 7:
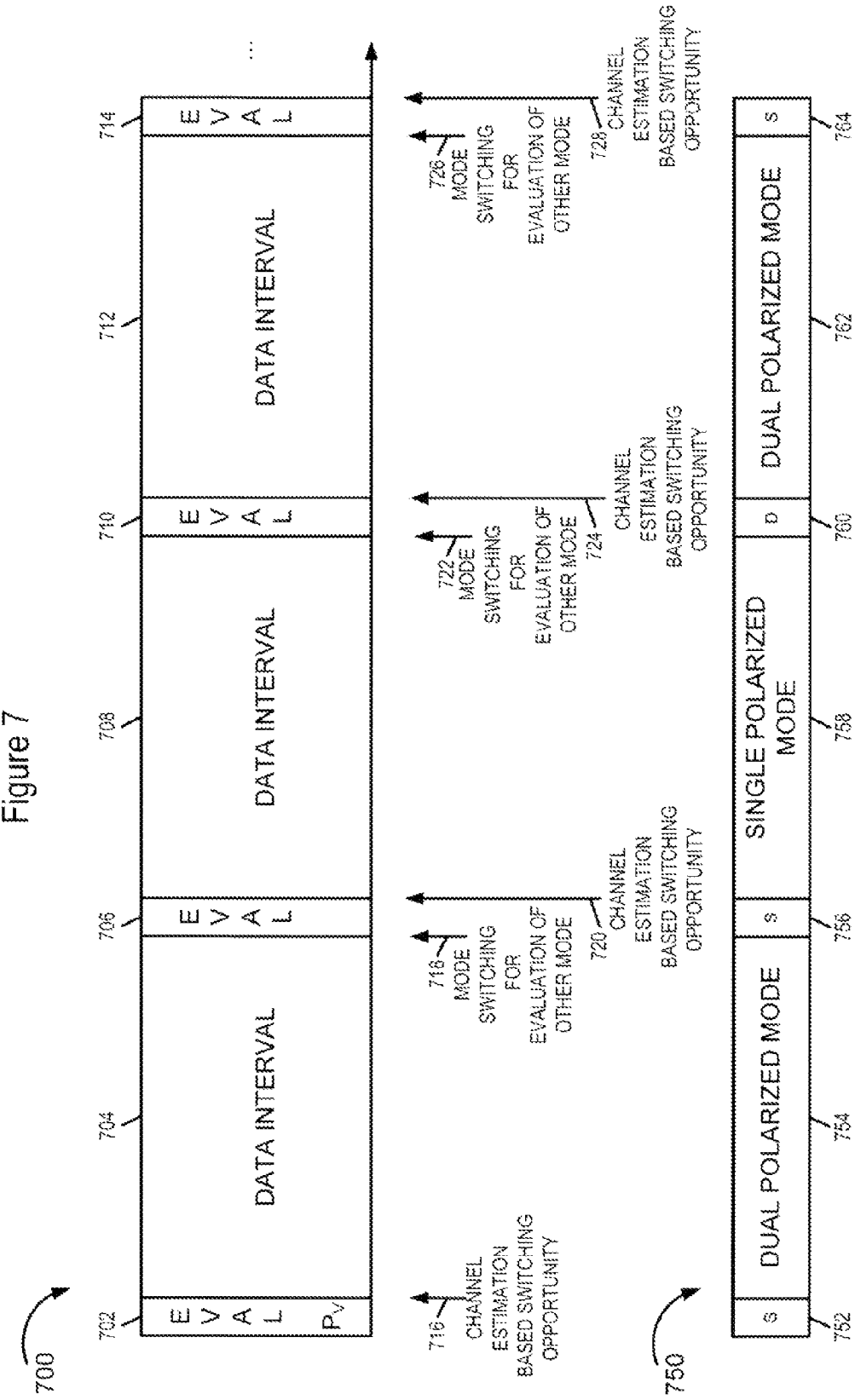
FIG. 7 includes a drawing illustrating an exemplary sequence of intervals including evaluation intervals and data intervals in an exemplary timing structure in accordance with one exemplary embodiment.

FIG. 7 includes a drawing 700 illustrating an exemplary sequence of intervals (evaluation interval 702, data interval 704, evaluation interval 706, data interval 708, evaluation interval 710, data interval 712, evaluation interval 714, . . . ) in an exemplary timing structure in accordance with one exemplary embodiment. In some embodiments, no traffic data signals, e.g., no user data signals, are communicated in the evaluation intervals. The exemplary sequence of intervals may be used, for example, in a communications device implementing the method of flowchart 100 of FIG. 1. In this exemplary embodiment, the communications device remains in a selected mode, e.g., one of a single polarization mode and dual polarization mode, during a data interval, and the communications device receives and evaluates pilot signals during the data interval in the selected mode, said pilot signals being communicated in addition to traffic signals during the data interval. However, at the end of a data interval, the communications device switches to the opposite mode of operation, so that it may evaluate pilot signals communicated in the other mode during a subsequent evaluation interval. Then, following the evaluation interval, the communications device makes a decision as to the selected mode for the next data interval and has an opportunity to switch modes. The decision as to which mode to use for the data interval, in some embodiments, is base on pilot signals received during the previous data interval and pilot signals received during the evaluation interval. Information such as estimated SNRs and/or rank information is used to make the decision.

Arrows (716, 720, 724, 728) identify channel estimation based switching opportunities with the decision of the switching being implemented for the following data interval (704, 708, 712), respectively. Arrows (718, 722, 726) identify points for mode switching such that the communications device may evaluate channel conditions in the other mode than was previously used in the prior data interval (704, 708, 714), respectively.

Drawing 750 illustrates one example illustrating mode switching for evaluation purposes and mode switching based on channel estimation information. Block 752 indicates that the communications device in operated in the single polarization mode of operation, e.g., receiving pilot signals from two vertical polarized antennas, during interval 702 which is an initial evaluation interval. Channel quality, e.g., SNRs and/or rank information is determined based on the received pilot signals. At point 716, the communications device makes a decision to switch to the dual polarized mode of operation and switches into the dual polarized mode of operation. During data interval 704, the communications device remains in the dual polarized mode of operation as indicated by block 754. During the dual polarized mode of operation the communications device receives pilot signals from antennas in two different polarization directions, e.g., from a vertical polarized antenna and from a horizontal polarized antennas. Then, at time 718 the communications device switches to the single polarized mode of operation. Block 756 indicates that the communications device operates in the single polarized mode of operation during evaluation interval 706, e.g., receiving pilot signals from two vertically polarized antennas. Based on channel conditions, the communications device decides to remain in the single polarized mode of operation, and therefore does not switch at point 720. The communications device remains in the selected single polarization mode during data interval 708 as indicated by block 758 and receives pilot signals during this interval, e.g., from two vertically polarized antennas.

At point 722, the communications device switches to the dual polarized mode for the evaluation interval 710 as indicated by block 760, and the communications device receives pilot signals from both a first and second polarization direction antennas. In this case at switching opportunity 724, the communications device selects dual polarized mode, so the device remains in the dual polarized mode for data interval 712 as indicated by block 762. Pilot signals are received on both direction polarization antennas during data interval 712. Then at time 726, the communications device switches to the other mode, which is the single polarization mode, and the single polarization mode is used for evaluation interval 714 as indicated by block 764. The communications device makes and implements another switching decision at point 728.

In some other embodiments, the communications device sets the mode to the single polarization mode for each evaluation interval, e.g., irrespective of the mode setting in the prior data interval. In some embodiments, the communications device evaluates both modes during the evaluation interval, e.g., being controlled to be in the single polarization mode during a first potion of the evaluation interval and being controlled to be in a dual polarized mode during a second portion of the evaluation interval.

Figure 8:
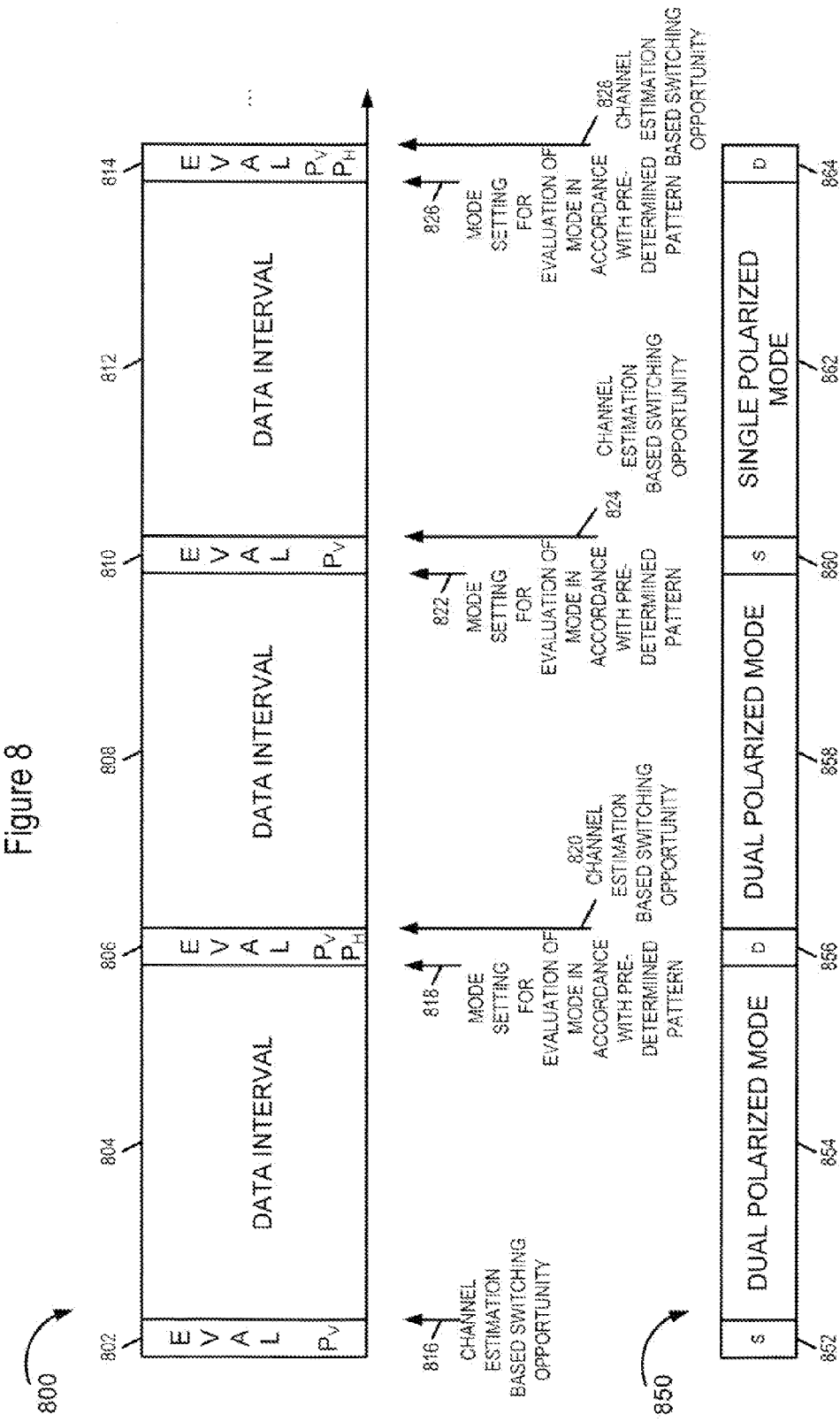
FIG. 8 includes a drawing illustrating another exemplary sequence of intervals including evaluation intervals and data intervals in an exemplary timing structure in accordance with one exemplary embodiment.

FIG. 8 includes a drawing 800 illustrating an exemplary sequence of intervals (evaluation interval 802, data interval 804, evaluation interval 806, data interval 808, evaluation interval 810, data interval 812, evaluation interval 814, . . . ) in an exemplary timing structure in accordance with one exemplary embodiment. In some embodiments, no traffic data signals, e.g., no user data signals, are communicated in the evaluation intervals. The exemplary sequence of intervals may be used, for example, in a communications device implementing the method of flowchart 100 of FIG. 1.

In this exemplary embodiment, the base station transmits Single polarized pilots in some evaluation periods and Dual polarized pilots in other evaluation periods, e.g., in accordance with in a predetermined pattern. The pilots transmitted by the base station during the evaluation periods are available to be used by a plurality of mobiles. One exemplary predetermined pattern specifies that the transmission is to alternate between single polarized pilots and dual polarized pilots for successive evaluation periods within a recurring timing structure.

The communications device, e.g., mobile wireless terminal, which is to receive and evaluate the pilots, is aware of the predetermined pattern being used for transmission and thus configures its mode of operation in accordance with the specified mode corresponding to the particular evaluation interval.

In this exemplary embodiment, the communications device remains in a selected mode, e.g., one of a single polarization mode and dual polarization mode, during a data interval, and the communications device receives and evaluates pilot signals during the data interval in the selected mode, said pilot signals being communicated in addition to traffic signals during the data interval. However, at the end of a data interval, the communications device is set to a mode of operation in accordance with a predetermined pattern corresponding to the evaluation intervals, so that it may evaluate pilot signals communicated in the specified mode for the particular evaluation interval. The communications device switches modes if the specified mode for the evaluation interval is different from the prior data interval.

Then, following the evaluation interval, the communications device makes a decision as to the selected mode for the next data interval and has an opportunity to switch modes. The decision as to which mode to use for the data interval, in some embodiments, is based on pilot signals received during the previous data interval and/or pilot signals received during the evaluation interval. Information such as estimated SNRs and/or rank information is used to make the decision.

Arrows (816, 820, 824, 828) identify channel estimation based switching opportunities with the decision of the switching being implemented for the following data interval (804, 808, 812), respectively. Arrows (818, 822, 826) identify points for mode setting such that the communications device may evaluate channel conditions in the mode specified in accordance with the predetermined pattern being used for evaluation periods.

Drawing 850 illustrates one example illustrating mode setting for evaluation purposes and mode switching based on channel estimation information. In this example the mode setting alternates for successive evaluation intervals. Block 852 indicates that the communications device in operated in the single polarization mode of operation, e.g., receiving pilot signals from two vertically polarized antennas, during interval 802 which is an initial evaluation interval. Channel quality, e.g., SNRs and/or rank information is determined based on the received pilot signals. At point 816, the communications device makes a decision to switch to the dual polarized mode of operation and switches into the dual polarized mode of operation. During data interval 804, the communications device remains in the dual polarized mode of operation as indicated by block 854. During the dual polarized mode of operation the communications device receives pilot signals from antennas in two different polarization directions, e.g., from a vertical polarized antenna and from a horizontal polarized antenna.

Then, at time 818 the communications device is set to the dual polarized mode of operation in accordance with the predetermined evaluation interval pattern. In this case the wireless terminal remains in the dual mode, since it happened to be in dual polarized mode during the prior data interval. In some embodiments, the wireless terminal can choose to ignore an evaluation interval, such as interval 806, in which the predetermined specified mode for the evaluation interval is the same as the previous data interval mode, because it can evaluate pilots from the data interval window. Thus in such a scenario, the wireless terminal may, and sometimes does, conserve power or perform a different function during such an evaluation interval.

Block 856 indicates that the communications device operates in the dual polarized mode of operation during evaluation interval 806, e.g., receiving pilot signals from both a first and second polarization direction antennas. Since data interval 804 and evaluation interval 806 were both in dual mode, the communications device remains in the selected dual polarization mode during next data interval 808 as indicated by block 858 and receives pilot signals during this interval, e.g., from both first and second polarization direction antennas.

At point 822, the communications device switches to the single polarized mode for the evaluation interval 810 as indicated by block 860, and the communications device receives pilot signals from two vertically polarized antennas. In this case at switching opportunity 824, the communications device selects single polarized mode, so the device is set to the single polarized mode for data interval 812 as indicated by block 862. Pilot signals are received on the two vertically polarized antennas during data interval 812. Then at time 826, the communications device switches to the dual polarization mode in accordance with the predetermined pattern being used of the evaluation intervals, and the dual polarization mode is used for evaluation interval 814 as indicated by block 864. The communications device makes and implements another switching decision at point 828.

In some other embodiments, the communications device sets the mode to the single polarization mode for each evaluation interval, e.g., irrespective of the mode setting in the prior data interval. In some embodiments, the communications device evaluates both modes during the evaluation interval, e.g., being controlled to be in the single polarization mode during a first potion of the evaluation interval and being controlled to be in a dual polarized mode during a second portion of the evaluation interval.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device, the method comprising:
    operating during a first period of time in a dual polarized mode of antenna operation;
    operating during a second period of time in a single polarized mode of antenna operation, said first and second periods of time being different; and
    selecting the dual polarized mode of antenna operation or the single polarized mode of antenna operation based on a quality of pilot signals received during a previous data interval.

2. The method of claim 1, further comprising:
    selecting between said dual polarized mode of antenna operation and said single polarized mode of antenna operation based on one of: i) a channel quality estimate and ii) a received antenna mode indicator signal.

3. The method of claim 2, further comprising:
    switching between said dual polarized mode of antenna operation and said single polarized mode of antenna operation when said selecting step selects a different one of said dual polarized mode of antenna operation and said single polarized mode of antenna operation than a current mode of operation in which the wireless communications device is operating.

4. The method of claim 3, wherein when said selecting is based on a channel quality estimate, the method further comprises:
    generating rank information for a channel matrix between transmitter antennas used to transmit to said wireless communications device and receive antennas included in said wireless communications device having a polarization which is the same as the polarization of the transmitter antennas; and
    making a selection between said dual polarized mode of antenna operation and said single polarized mode of antenna operation based on both the channel quality estimate and said generated rank information.

5. The method of claim 4, further comprising:
    transmitting an antenna mode indicator signal over an airlink.

6. The method of claim 3, wherein when said selecting is based on a received antenna mode indicator signal, said selecting includes detecting an antenna mode of operation indicated by the received antenna mode indicator signal and selecting the antenna mode of operation indicated by the received signal.

7. The method of claim 3, wherein said switching is performed at specific points in time within a predetermined timing structure at which said wireless communications device is permitted to switch between said dual polarized mode of operation and said single polarized mode of operation.

8. The method of claim 2,
wherein when said dual polarized mode of operation is selected, the method further comprises:
recovering data from signals output by first and second antennas polarized at more than 75 degrees to each other; and
wherein when said single polarized mode of operation is selected, the method further comprises:
recovering data from signals output by multiple antennas polarized in the first direction without using the output of an antenna polarized in a different direction.

9. The method of claim 8, wherein the first and second directions are vertical and horizontal directions, respectively.

10. The method of claim 2,
wherein when said dual polarized mode of operation is selected, the method further comprises:
transmitting data from a first antenna and a second antenna, the first and second antennas being polarized at more than 75 degrees to each other; and
wherein when said single polarized mode of operation is selected, the method further comprises:
transmitting data from multiple antennas polarized in the first direction without transmitting data on an antenna polarized in a different direction.

11. The method of claim 1, further comprising:
at an end of a data interval, switching to a different one of said dual polarized mode of antenna operation and said single polarized mode of antenna operation than a mode of operation in which the wireless communications device was operating during the data interval.

12. The method of claim 11, further comprising:
operating during an evaluation interval in the different mode of antenna operation.

13. The method of claim 1, further comprising:
at an end of a data interval, selecting one of said dual polarized mode of antenna operation and said single polarized mode of antenna operation based on a predetermined pattern of pilot signal transmissions during evaluation intervals.

14. The method of claim 13, wherein the predetermined pattern of pilot signal transmissions is selected from one of the following: always setting a same mode of antenna operation for each evaluation interval, alternating modes of antenna operation for successive evaluation intervals, and operating in one of said dual polarized mode of antenna operation and said single polarized mode of antenna operation during a first portion of each evaluation interval and operating in the other of said dual polarized mode of antenna operation and said single polarized mode of antenna operation during a second portion of each evaluation interval.

15. A communications device comprising:
means for operating the device during a first period of time in a dual polarized mode of antenna operation;
means for operating the device during a second period of time in a single polarized mode of antenna operation, said first and second periods of time being different; and
means for selecting the dual polarized mode of antenna operation or the single polarized mode of antenna operation based on a quality of pilot signals received during a previous data interval.

16. The device of claim 15, further comprising:
means for selecting between dual polarized mode of antenna operation and said single polarized mode of antenna based on one of: i) a channel quality estimate and ii) a received antenna mode indicator signal.

17. The device of claim 16, wherein switching is performed between said dual polarized mode of antenna operation and said single polarized mode of antenna operation when said selecting step selects a different one of said dual polarized mode of antenna operation and said single polarized mode of antenna than a current mode of operation in which the wireless communications device is operating.

18. A computer readable medium embodying machine executable instructions for controlling a device to implement a method, the method comprising:
operating during a first period of time in a dual polarized mode of antenna operation;
operating during a second period of time in a single polarized mode of antenna operation, said first and second periods of time being different; and
selecting the dual polarized mode of antenna operation or the single polarized mode of antenna operation based on a quality of pilot signals received during a previous data interval.

19. The computer readable medium of claim 18, wherein the method further comprising:
selecting between said dual polarized mode of antenna operation and said single polarized mode of antenna operation based on one of: i) a channel quality estimate and ii) a received antenna mode indicator signal.

20. The computer readable medium of claim 19, wherein the method further comprising:
switching between said dual polarized mode of antenna operation and said single polarized mode of antenna operation when said selecting step selects a different one of said dual polarized mode of antenna operation and said single polarized mode of antenna than a current mode of operation in which the wireless communications device is operating.

21. A wireless communications device comprising:
a processor configured to control said device to:
operate during a first period of time in a dual polarized mode of antenna operation;
operate during a second period of time in a single polarized mode of antenna operation, said first and second periods of time being different; and
select the dual polarized mode of antenna operation or the single polarized mode of antenna operation based on a quality of pilot signals received during a previous data interval.

22. The device of claim 21, wherein the processor is further configured to:
select between said first and second modes of operation based on one of: i) a channel quality estimate and ii) a received antenna mode indicator signal.

23. The device of claim 22, wherein the processor is further configured to: switch between said dual polarized mode of antenna operation and said single polarized mode of antenna operation when said selecting step selects a different one of said first and second modes of operation than a current mode of operation in which the wireless communications device is operating.

24. The device of claim 21 further comprising:
a first antenna element polarized in a first direction;
a second antenna element polarized in a second direction, said first and second directions being different by at least 45 degrees;

a first signal processing module coupled to said first antenna element; and a second signal processing module coupled to said second antenna element, wherein both said first and second antenna elements operate during said dual polarized mode, and wherein one of said first and second antenna elements operate during said single polarized mode.

25. The device of claim 24, wherein said first and second signal processing modules are used for one of: i) recovering data from first and second received signals having the same frequency but different polarizations and ii) generating first and second signals having the same frequency to be transmitted with different polarizations.

26. The device of claim 25, further comprising:

an antenna mode selection module for selecting between said dual polarized mode of operation and said single polarized mode of operation as a function of received channel quality information;

wherein when said dual polarized mode of operation is selected signals from said first and second antenna are used to support communications; and wherein when said single polarized mode of operation is selected, said first and said third antenna elements are used to support communications.

27. The device of claim 26, wherein said received signal is a signal from which a channel quality estimate is made; and wherein said antenna mode selection module selects said dual polarized mode of operation when said channel quality estimate indicates a first channel quality and selects said single polarized mode of operation when said channel quality estimate indicates a second channel quality which is lower than said first channel quality.

28. The device of claim 27, further comprising an antenna mode indicator signal generation module for generating a signal indicating said selected antenna mode of operation; and an antenna mode indicator signal transmission control module for controlling transmission of said antenna mode indicator signal.

29. The device of claim 24, further comprising:

a third antenna element polarized in said first direction;

an antenna switching module used to couple said second and third antenna elements to said second signal processing module, said antenna switching module selectively passing signals between one of: i) said second antenna element and ii) said third antenna element and said second processing module at any given time.

30. The device of claim 29, further comprising:

a channel quality determination module for generating channel quality indicators from received signals, said channel quality indicators including a signal to noise ratio value.

31. The device of claim 30, further comprising:

a channel quality information transmission control module for controlling transmission of channel quality information, said channel quality information including said signal to noise ratio value and one of i) rank information for a channel matrix between transmitter antennas used to transmit to said communications device and receive antennas included in said communications device having a polarization which is the same as the transmitter antennas and ii) additional signal to noise ratio information.

32. The device of claim 31, further comprising:

an antenna mode indicator signal detection module for detecting receipt of an antenna mode indicator signal and for recovering information indicating one of said dual polarized mode of operation and said single polarized mode of operation.

33. The device of claim 30, further comprising:

an antenna mode selection module for selecting between said dual polarized mode of operation and said single polarized mode of operation as a function of said generated channel quality indicators.

34. The device of claim 33, further comprising:

an antenna mode indicator signal generation module for generating a signal indicating said selected antenna mode of operation; and an antenna mode indicator signal transmission control module for controlling transmission of said antenna mode indicator signal.

35. The device of claim 30, wherein said communications device is a transceiver, the communications device further comprising:

a transmitter/receiver mode control module for controlling whether said communications device operates in a transmit or receive mode of operation; and an antenna mode selection module for selecting between said dual polarized mode of operation and said single polarized mode of operation as a function of a received signal;

wherein the said antenna mode selection module selects the dual polarized or single polarized mode of operation based on the said antenna mode indicator signal.

36. The device of claim 35, wherein said received signal is an antenna mode indicator signal.

37. The device of claim 29, wherein when said dual polarized mode of operation is selected, said antenna switching module is controlled to couple said second antenna element to said second signal processing module; and wherein when said single polarized mode of operation is selected, said antenna switching module is controlled to couple said third antenna element to said second signal processing module.

38. The device of claim 37, wherein said first direction is a vertical direction; and wherein said second direction is a horizontal direction.

* * * * *